June 18, 1940. S. E. WINDER 2,205,261
NARROW NECK BOTTLE FORMING MACHINE
Filed Sept. 15, 1937 10 Sheets-Sheet 4

Fig. 4.

Inventor
Samuel E. Winder.
By Cushman Darby Cushman
Attorneys

June 18, 1940.                S. E. WINDER                2,205,261
                    NARROW NECK BOTTLE FORMING MACHINE
                  Filed Sept. 15, 1937          10 Sheets-Sheet 5

Inventor
Samuel E. Winder
By Cushman Darby & Cushman
                    Attorney

Fig. 7.

Patented June 18, 1940

2,205,261

UNITED STATES PATENT OFFICE 2,205,261

NARROW NECK BOTTLE FORMING MACHINE

Samuel E. Winder, Baltimore, Md., assignor of one-half to Henry C. Daubenspeck, Columbus, Ohio Application September 15, 1937, Serial No. 164,083

20 Claims. (Cl. 49—9)

This invention relates to an automatic machine for forming hollow articles of glassware. More particularly, the invention provides a new and improved automatic machine for blowing narrow neck bottles. The machine is of the general class wherein a charge of glass is first formed into a hollow blank or parison in a blank mould and is then blown to finished form in a blow mould. It is radically different in many respects, however, from conventional narrow neck machines, as will be pointed out hereinafter.

It is an object of the present invention to provide an extremely simple narrow neck machine, characterized by high efficiency and a high rate of production.

In order to simplify the construction and to make the machine compact and highly efficient, the invention provides a single table, continuously rotating machine having a plurality of pairs of permanently inverted parison and blow moulds mounted opposite each other on the single table.

One of the principal objects of the invention is to improve and simplify the transfer of a parison from its position in the parison mould to its position in the blow mould. To this end, the machine obviates the necessity of inverting and reverting the parison mould or the parison. Instead, the bottles are formed in an inverted position, from beginning to end. In this respect, the machine of the present invention is an improvement on my prior Patents Nos. 998,824, 1,072,553 and 1,491,369.

It is a further object of the invention to obviate the use of a neck ring as a means for supporting the parison during its transfer from the parison mould to the blow mould. Instead, the parison is supported by a suction head engaging its bottom during the transfer. The inner periphery of the neck finish is in engagement with a steadying member during the transfer, to prevent lateral movement of the neck under the influence of centrifugal force resulting from rotation of the table, but this engagement will not deform the finish.

It is a further object of the invention to provide improved and simplified take-out means for the finished bottles.

It is a further object to provide cam-operated means for performing the various steps in the manufacture of the bottles, all of said means being provided with resilient safety features to prevent jamming of the machine or breakage of parts, in the event that molten glass or cullet should become lodged between any of the operative parts.

Other and further objects and advantages of the invention will be apparent to one skilled in the art upon consideration of the following description of the illustrative embodiment of the invention shown in the accompanying drawings.

Figure 1:
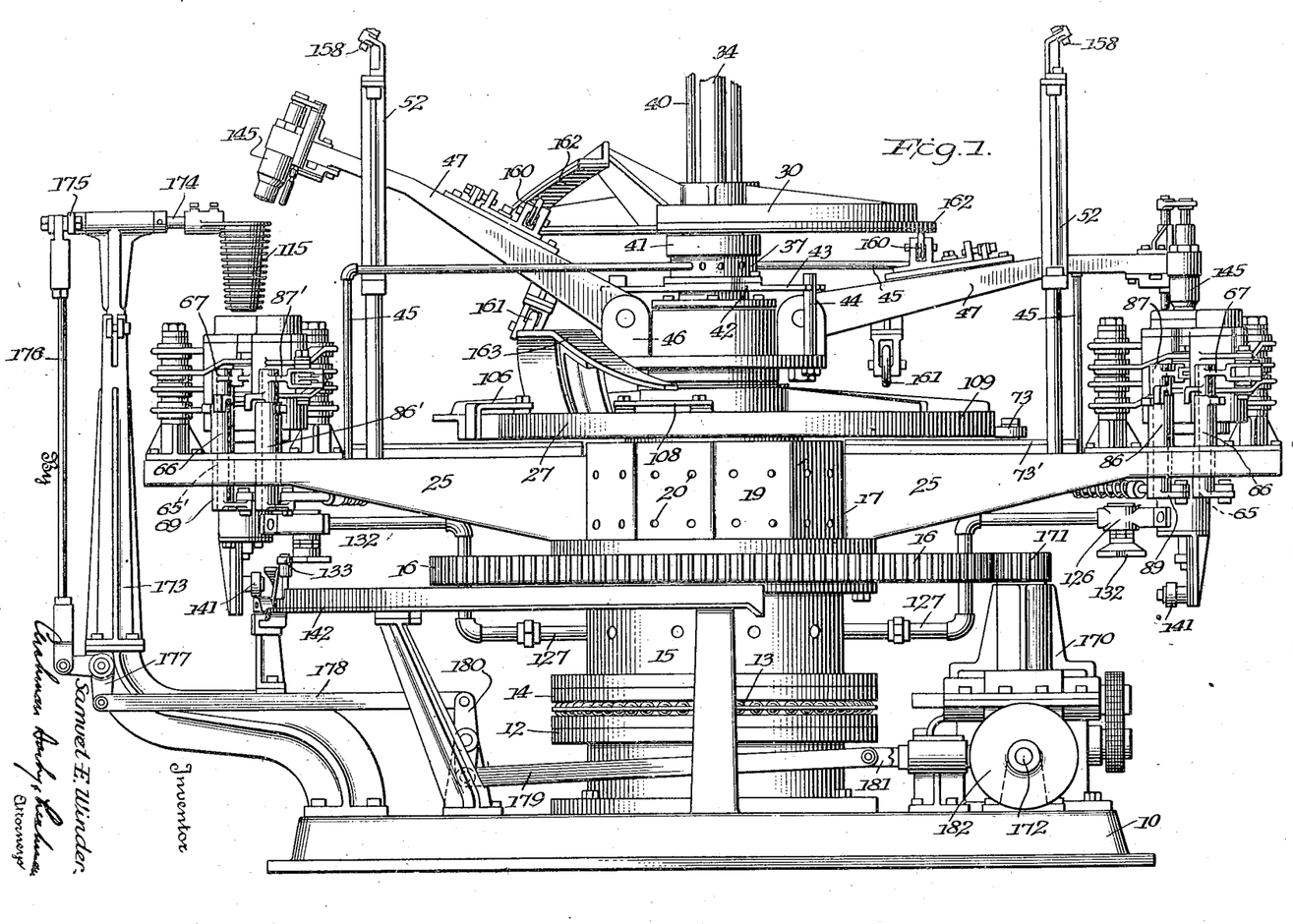
Figure 1 is a side elevation of the machine, showing two sets of moulds and their associated parts, the remaining sets of moulds having been removed for the sake of clarity.
Figure 3:
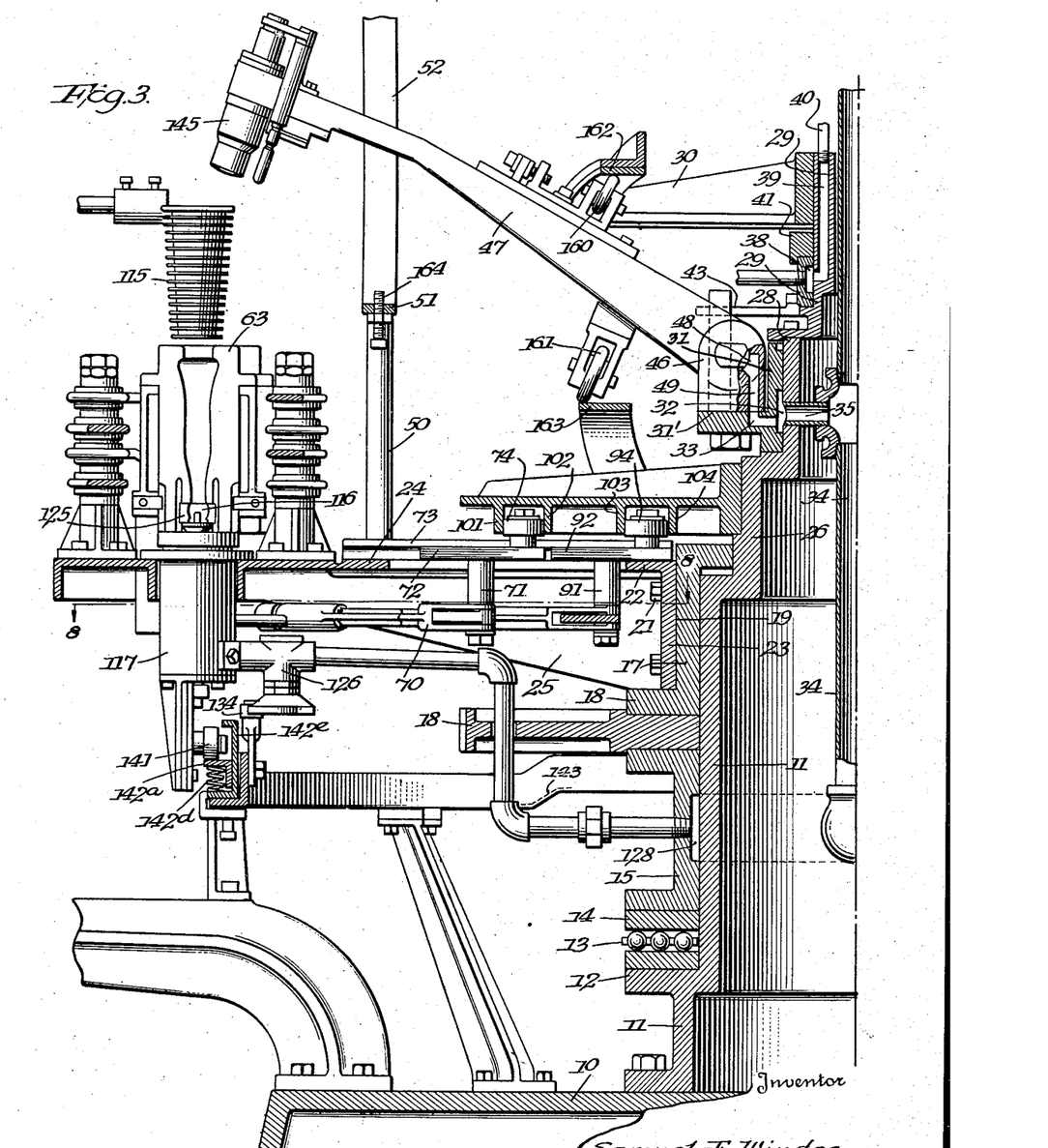
Figure 3 is a vertical sectional view of the left-hand half of Figure 1.
Figure 4:
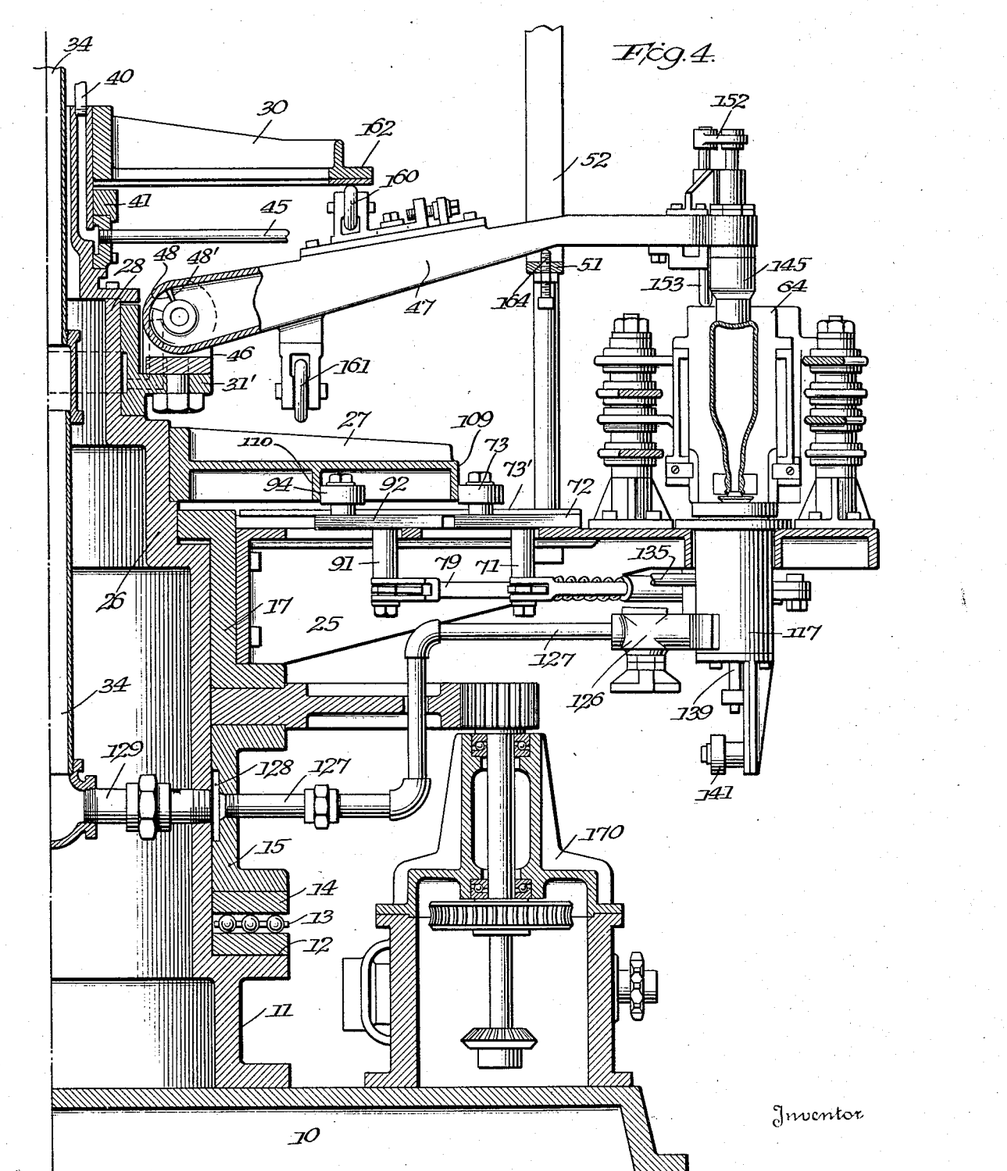
Figure 4 is a vertical sectional view of the right-hand half of Figure 1.

Referring particularly to Figures 1, 3 and 4, the machine is supported from a base 10 which may be provided with wheels adapted to run on tracks or the like, in order that the machine as a whole may be moved to and from operative position with respect to a glass feeder. Projecting upwardly from the base and bolted or otherwise secured with respect thereto, is a stationary column 11 having a horizontal annular flange 12 which serves to support a ball bearing assembly 13. Above the upper race 14 of the assembly, is the lower ring 15 of a rotatable column. The rotatable column is built up from a plurality of superposed sections comprising the lower ring 15, an intermediate gear 16, and an upper annular member 17. The upper ring 17 is provided with a lower horizontal annular flange 18 and a plurality of vertically disposed plane faces 19, the latter being drilled at 20 to receive bolts 21 or the like adapted to secure the table sections 22 thereto. Each table section comprises an inner, vertically disposed backing plate 23, a horizontal top portion 24 and a vertically disposed reinforcing web 25. In the present embodiment, the machine comprises ten pairs of moulds and the table is made up of ten sections 22.

The stationary inner column 11 is provided with an intermediate reduced portion 26 which supports a stationary cam plate 27, the structure and function of which are hereinafter described. Above the portion 26 is a still further reduced portion 28 adapted to serve as the inner wall of an air chest, as described below. At its upper end the stationary column 11 supports an annular top member 29, which carries a second horizontally projecting cam plate 30.

Above the portion 26 of the stationary column 11, and opposite the portion 28 thereof, there is rotatably mounted an annular sleeve 31 having an annular recess 32 formed on its inner face. A plurality of spaced passages 33 lead outwardly and upwardly from the chamber 32, through a horizontally flanged portion 31' of the sleeve 31. A central vacuum pipe 34, provided with a branch nipple 35, extends downwardly through the stationary column 11. The branch 35 communicates with the annular recess 32 and with each outwardly disposed passage 33.

A second rotatable sleeve 37, having an annular recess 38 formed on its inner face, is disposed around the upper end member 29 of stationary column 11. The recess is in communication with a passage 39 formed in the member 29 to which blowing-air is admitted by the pipe 40. The sleeve 37 is clamped between rings 41, 42 and the latter is provided with a plurality of outwardly projecting arms 43 having bifurcated ends embracing posts 44, upstanding from the sleeve 31, whereby rotation is imparted from the rotatable sleeve 31 to the sleeve 37. A plurality of pipes 45 or the like communicate between the annular recess 38 and the several blow heads, as hereinafter described.

The flange 31' of the sleeve 31 supports a plurality of bifurcated, upstanding brackets 46, bolted or otherwise secured thereto. An outwardly projecting hollow arm 47 is pivoted on each bracket 46 and the arms and brackets are provided with air passages 48, 49 registering with the passages 33.

Each table section 24 carries a pair of upstanding posts 50, supporting a crosshead 51 at their upper ends. Each crosshead 51 has associated therewith, an upwardly projecting, vertically slotted bracket 52. The vertical slot in each bracket 52 embraces the outer end of its arm 47 and prevents relative lateral movement of the latter. Thus, as the table turns, rotation is imparted by the brackets 52 to the arms 47. The sleeve 31 rotates the sleeve 37, as hereinbefore explained. As a result, all of the rotatable parts supported on the stationary column 11 rotate in unison.

The moulds and their operating mechanism will now be described. Since each pair of moulds is substantially identical to the others, a description of one will suffice.

Each table section 24 is provided with a pair of vertically disposed radially aligned posts 55, 56, upon which the moulds are pivotally mounted. The post 55 is mounted in a bracket 57 and a similar bracket 58 supports the post 56. The parison mould holders 59, 59' have arms 60 which are pivotally mounted on the post 55 and the blow mould holders 61, 61' are likewise mounted on the post 56 by means of arms 62. The parison mould halves 63, 63' may be secured in the mould holders in any appropriate manner, and the same is true of the blow mould halves 64, 64'. The parts are so constructed that the parison moulds and the blow moulds are alternately pivoted or swung to closed position about the same moulding axis.

Figure 8:
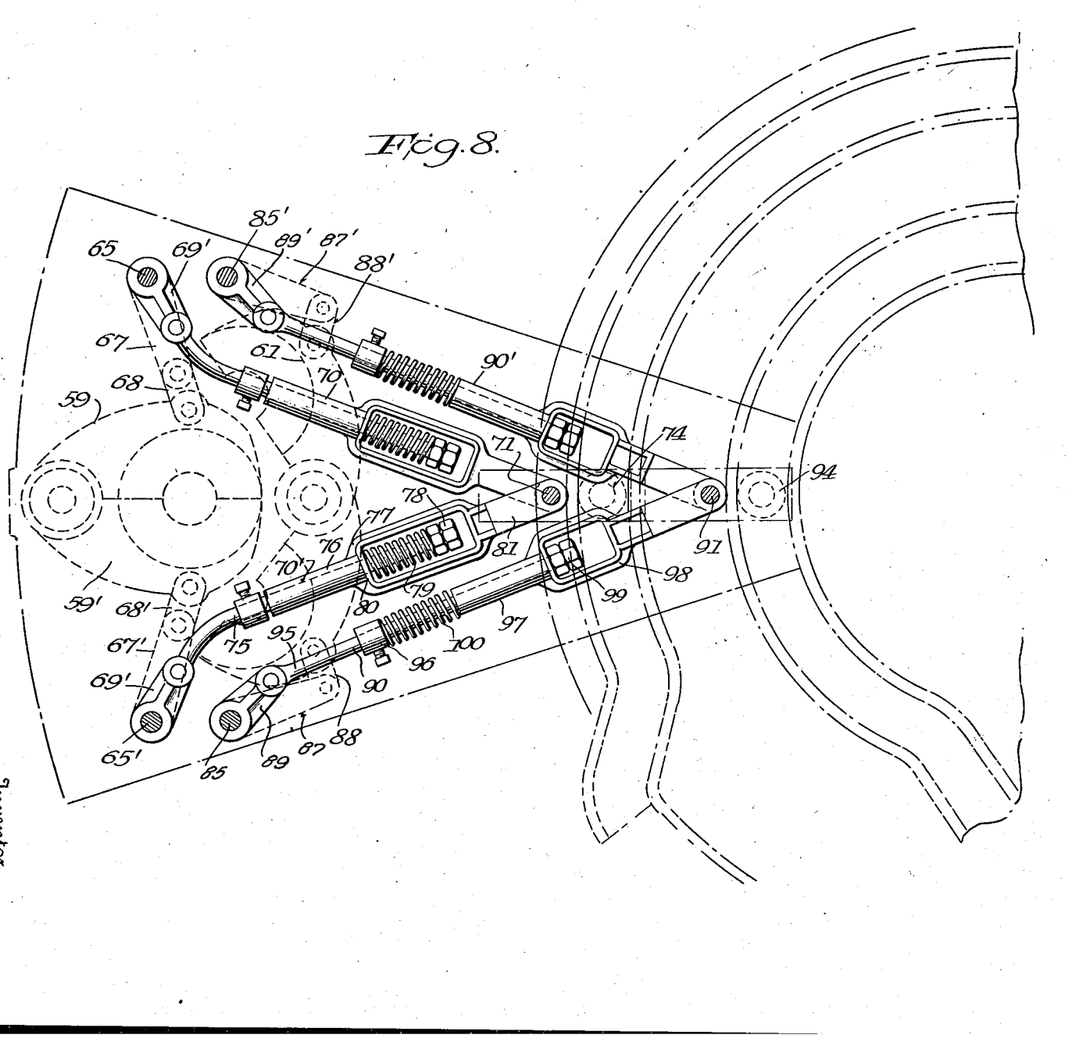
Figure 8 is a horizontal sectional view taken on a plane represented by line 8—8 of Figure 3, showing the mould opening and closing means.

The moulds are opened and closed by means of vertically disposed stub shafts journalled in and extending above and below the table sections 24. Referring to Figures 1 and 8, the movements of the parison mould are controlled by shafts 65, 65' journalled in upstanding sleeves 66, 66'. The rotatable shafts 65, 65' carry at their upper ends lever arms 67, 67', connected to the parison mould holders by links 68, 68', whereby when the shafts are oscillated, the parison moulds are opened and closed. As indicated in Figure 8, the lever arms 67 and their associated links 68 are preferably brought into alignment, in dead center position, when the moulds are closed.

The lower ends of the shafts 65, 65' carry lever arms 69, 69', attached at their ends to connecting rods 70, 70'. As shown in Figures 3 and 8, the rods 70 are secured at their inner ends to a downwardly projecting post 71 which is secured to a slide 72 mounted on the table section 24, between guide flanges 73, 73'. Each slide 72 carries, on its upper side, a cam roller 74, disposed in operative relation to a cam track associated with the plate 27, as hereinafter described.

The connecting rods 70 are provided with resilient safety devices. Each rod comprises an inner shaft 75, bent slightly at its outer end and pivotally connected to the lever 69. A sleeve 76 provided with an open, yoke portion 77, surrounds the shaft 75. The inner end of the shaft is provided with bolts 78 and a coil compression spring 79. The spring is interposed between the bolts 78 and the base 80 of the yoke portion 77. The sleeve member 76 is extended at its inner end 81, and is connected to the post 71, as aforesaid. It will be seen, therefore, that an inwardly directed pull from the slide 72 will be transmitted through the spring 79 to the shafts 65 to close the parison mould. If, for any reason, the mould should be prevented from closing, a resilient lost motion connection is provided between the shaft 75 and the sleeve 76, whereby breakage of the parts is prevented.

The means for opening and closing each blow mould is similar to that described above. A pair of vertically disposed stub shafts 85, 85' are journalled in upstanding sleeves 86, 86'. The shafts carry at their upper and lower ends, respectively, lever arms 87, 87', 89 and 89'. Links 88, 88' connect the upper levers to the blow mould holders. The lower lever arms 89, 89' are pivotally attached to the outer ends of connecting rods 90, 90'. The inner ends of the connecting rods 90, 90' are secured to a downwardly projecting post 91, carried by a slide 92 disposed on the table 24 and guided by the flange guide members 73, 73'. Each slide 92 supports on its upper surface, a cam roller 94 disposed in engagement with a second cam track on the plate 27.

The connecting rods 90, 90' likewise embody resilient safety features. These members are each made up of an inner shaft 95 having an abutment sleeve 96 secured thereto. The rod 95 is telescoped inside of a sleeve 97, the latter being connected at its inner end to the post 91. The sleeve 97 has a yoke portion 98 formed therein, in which the inner end of the shaft 95 is disposed. Nuts 99 are threaded on the inner end of the shaft 95 and disposed in the opening in the yoke portion. A coil compression spring 100 is disposed between the outer end of the sleeve member 97 and the abutment ring 96, fast on the shaft 95. Thus, the force serving to close the blow mould, upon an outward movement of the connecting rod 90, is transmitted through the spring 100. If the mould is prevented from closing, the spring will be compressed to avoid the breakage of any of the parts.

Figure 7:
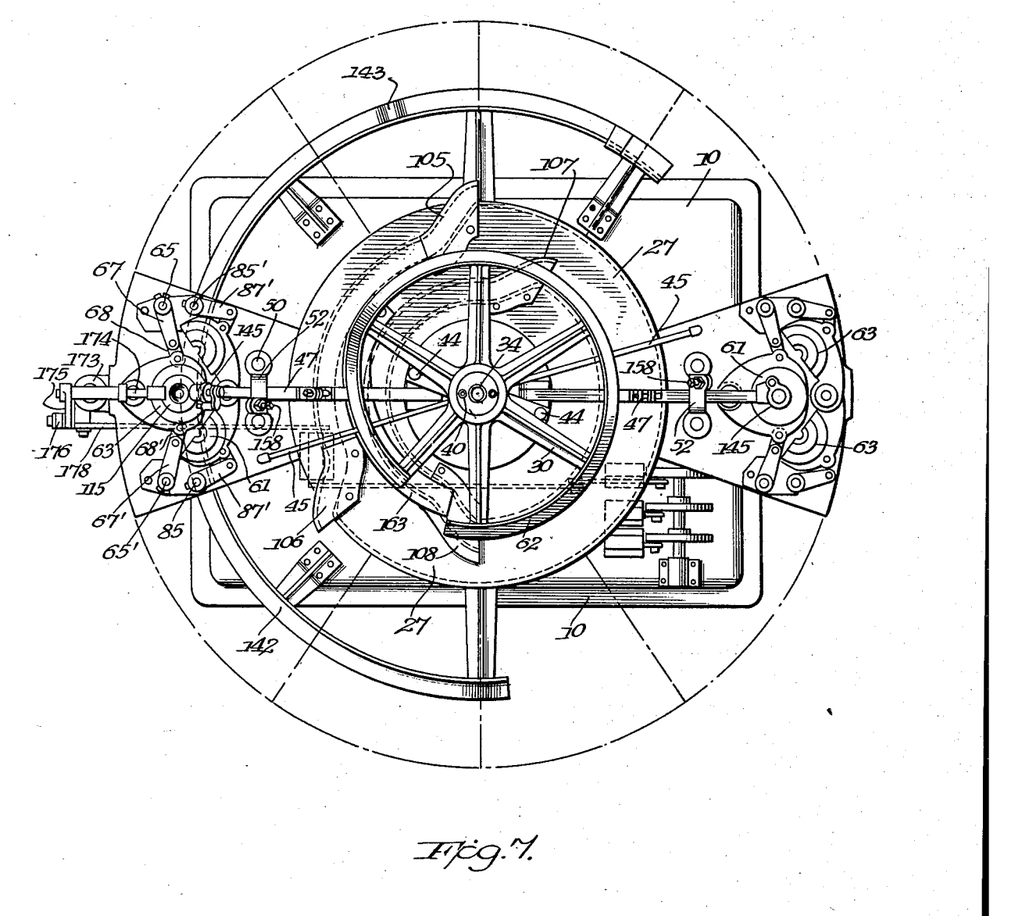
Figure 7 is a top plan view of the machine of Figure 1, showing two sets of moulds only.
Figure 9:
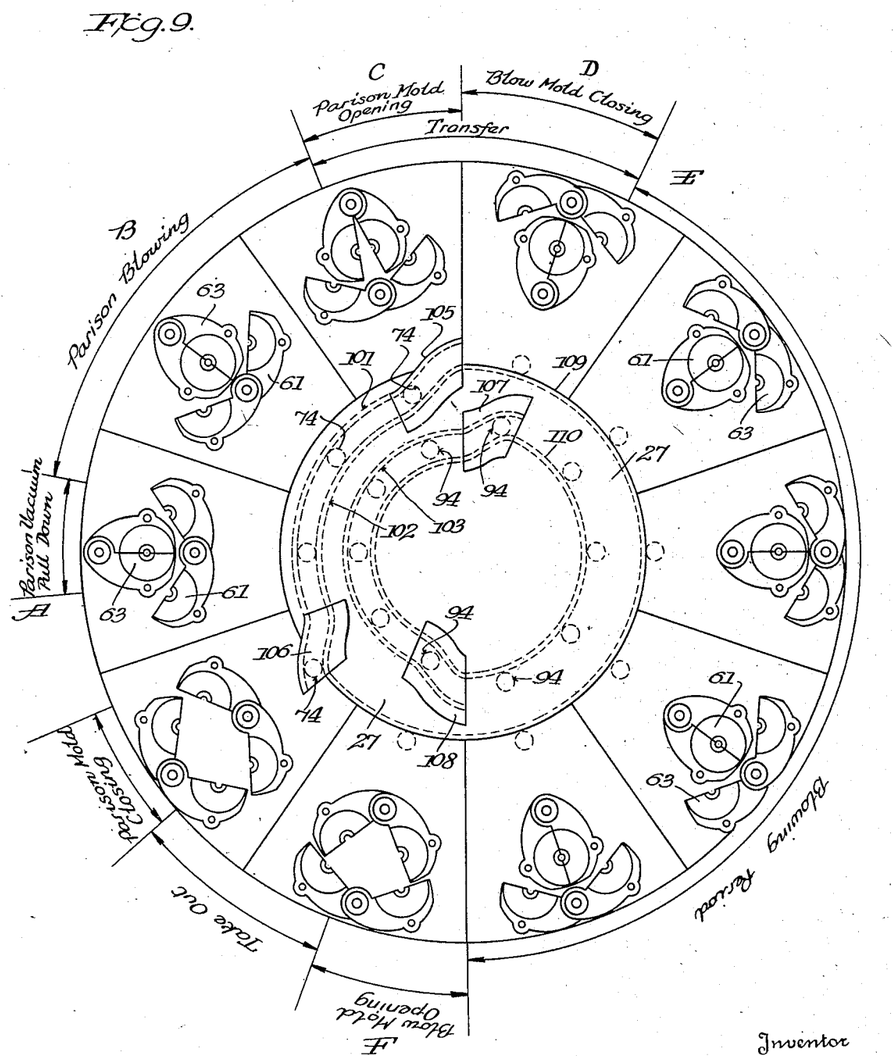
Figure 9 is a diagrammatic plan view of the machine, showing the relative positions of ten sets of moulds.

The cam plate 27 is provided with a plurality of downwardly projecting flanges, forming cam tracks for the rollers 74 and 94. As shown in Figure 3, four flanges 101, 102, 103 and 104 are shown, but it will be understood that only two flanges, such as those indicated by reference characters 101 and 103 are essential, because, in that view, the slides 72 and 92 are both in their innermost positions, holding the parison mould closed and the blow mould open. Referring to Figures 7 and 9, the cam plate is slotted or otherwise cut away at four spaced points, and end members 105, 106, 107, 108 are bolted or otherwise secured in place. These members having downwardly projecting flanges associated therewith which act as continuations of the flanges on the main cam plate. Thus, the end member 105 will shift each roller 74, successively, from its position in engagement with flange 101 outwardly into engagement with the downwardly projecting peripheral flange 109, as shown in Figures 4 and 9. The opposite end member 106 will subsequently draw the roller 74 inwardly, again to engage the flange 101, when the parison mould is to be moved to closed position. The cam end member 107 will shift the blow mould operating rollers 94 from engagement with the track 103, outwardly into engagement with the downwardly projecting flange 110 (Figs. 4 and 9) to close the blow moulds and maintain them in closed position. The other cam member 108 draws the rollers 94 inwardly, to cause them to open the blow moulds and to reengage the flange 103 to hold them open.

The cam end members 105—108 may each be mounted for adjustment, circumferentially of the plate 27, to change the timing of the mould opening and closing movement. Moreover, the end members may be readily removed from the machine and differently shaped cam members substituted therefor, to effect adjustments in the operation of the machine.

The means by which a charge of glass is formed into a parison in the parison mould will now be described.

Referring to Figure 3, a charge of glass may be dropped into the parison mould 63 through the oscillating funnel 115, described below.

Figure 11:
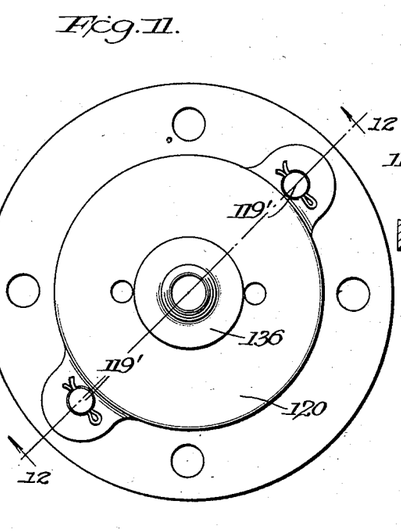
Figure 11 is a top plan of one of the blow heads.

The charge is compacted in the lower, neck finish end 116 of the parison mould by creating a vacuum at that end. Each table section is provided with a relatively stationary blow head assembly, comprising means for applying suction to the lower end of the mould, means for forming an initial blow opening in the charge, and means for applying blowing-air thereto. The blow head assembly (Fig. 5) includes an outer cylindrical casing 117, an inner cylindrical member 118, terminating at its upper end in a top flange 119, and a cap 120, shown in detail in Figures 11 and 12, and described below. The space 121 between the inner and outer cylindrical members 117, 118 provides a vacuum passage leading upwardly through bores 122 and 123 to the suction grooves 124 formed on the meeting faces of the parison mould halves. The neck finish inserts 125 are preferably so constructed that a small space is provided between their meeting faces, to permit the application of vacuum from the grooves 124 directly to the glass in the finish forming portion of the parison mould.

The outer casing 117 of the blow head carries a valve housing 126, connected to a pipe 127 leading to an annular recess 128 (Fig. 3) formed on the inner face of the movable column section 15. The central vacuum pipe 34 (Fig. 4) is provided with a branch conduit 129 at its lower end, communicating with the annular recess 128, whereby a partial vacuum is created in the recess, in the pipe 127, and in the space 121 between the concentric cylindrical casings 117, 118, Figure 5.

Figures 5, 10:
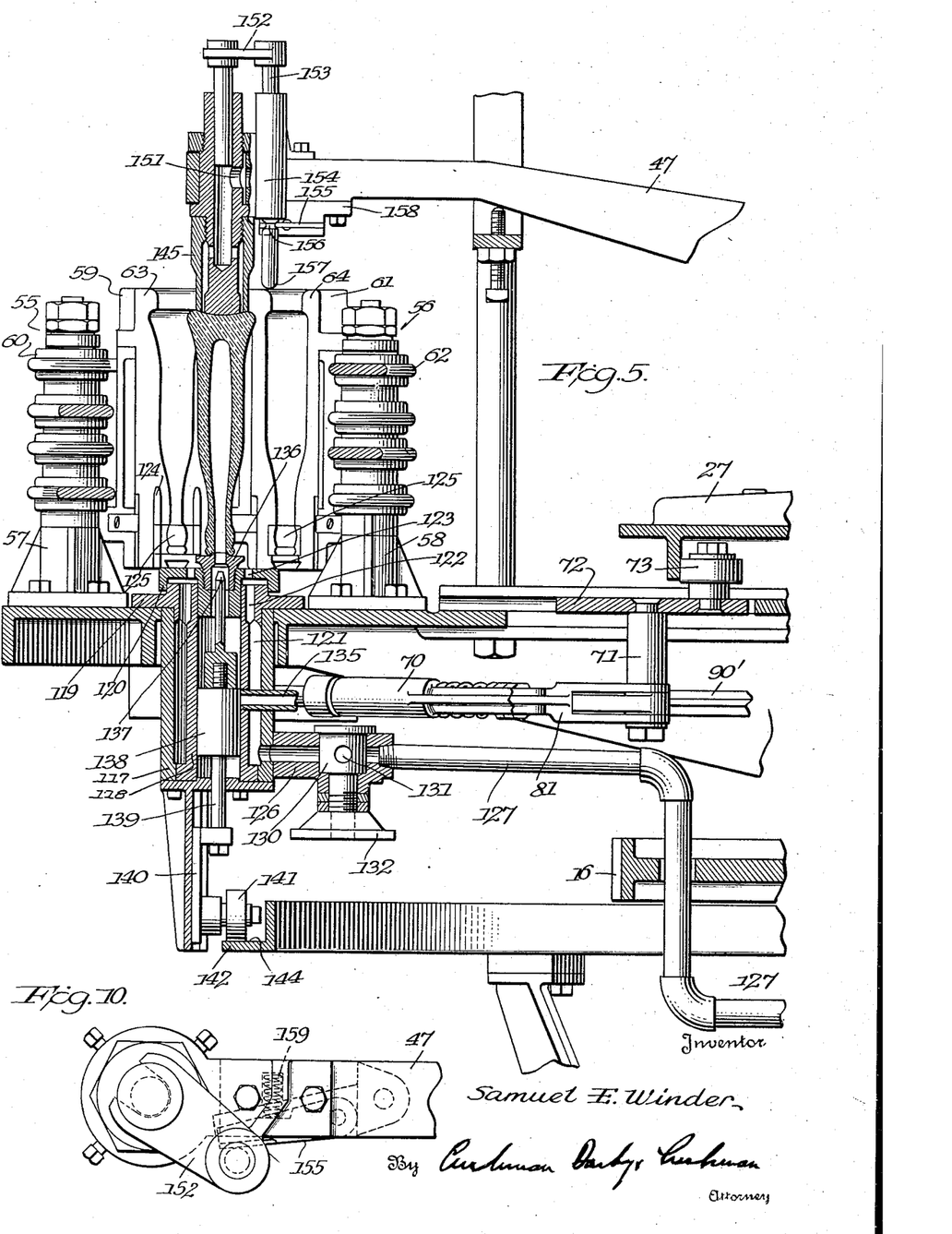
Figure 5 is a somewhat enlarged vertical sectional view showing the moulds at the mould transfer position.
Figure 10 is a fragmentary top plan view of the suction head and associated parts shown at the top of Figure 5.

The application of suction to the chamber 121 is controlled by a valve 130, rotatably mounted in the casing 126, and provided with a transverse bore 131, as shown in Figure 5. A four-pointed star wheel 132 is fixed to the valve body to control its movement. A pair of stationary, adjustable rollers 133, 134 (Figs. 1, 2 and 3) are disposed adjacent the feeding and compacting stations to engage the star wheel and turn it through a quarter of a revolution. The first roller 133, therefore, turns each valve 130 so as to apply suction to the lower end of the parison mould, and the second roller 134, again closes the valve, to terminate the suction.

Blowing-air is applied to each blow head from one of the pipes 45 (Fig. 1) through continuation pipes 135, which extend through the outer casing 117 and into the spaces interiorly of the inner casings 118. The cap piece 120 (Figs. 5, 11 and 12) at the upper end of each blow head, is provided with a central threaded bore in which a mouth finish forming nipple 136 is secured. A mouth forming pin 137 is adapted to be projected upwardly through the nipple to form an initial blow opening in the charge. The pin is mounted on the upper end of a cylindrical, plug-like valve body 138, slidably mounted in the cylindrical interior of the inner casing 118. A stem 139 depends from the lower end of the body 138 and is attached to a vertical slide 140, having an outwardly projecting roller 141 on its lower end. The roller 141 rides on a cam track 142, which controls the position of the valve body 138 and the neck pin 137.

The neck pin and the valve body 138 assume three normal positions. When in their uppermost position, the pin is projected upwardly through the nipple 136 to form an opening in a charge of glass when the latter is compacted in the neck finish end of the parison mould. When in this position, the valve body 138 cuts off the blowing-air by closing the end of the pipe 135. When the body is moved downwardly to its intermediate or neutral position, as shown in Figure 5, the neck pin is withdrawn, but the blowing-air is still cut off. When in its lowermost position, the valve body 138 uncovers the pipe 135 and blowing-air flows upwardly through the nipple 136 to blow a charge of glass into a hollow parison, or to blow a parison into a finish bottle.

Figures 2, 2A:
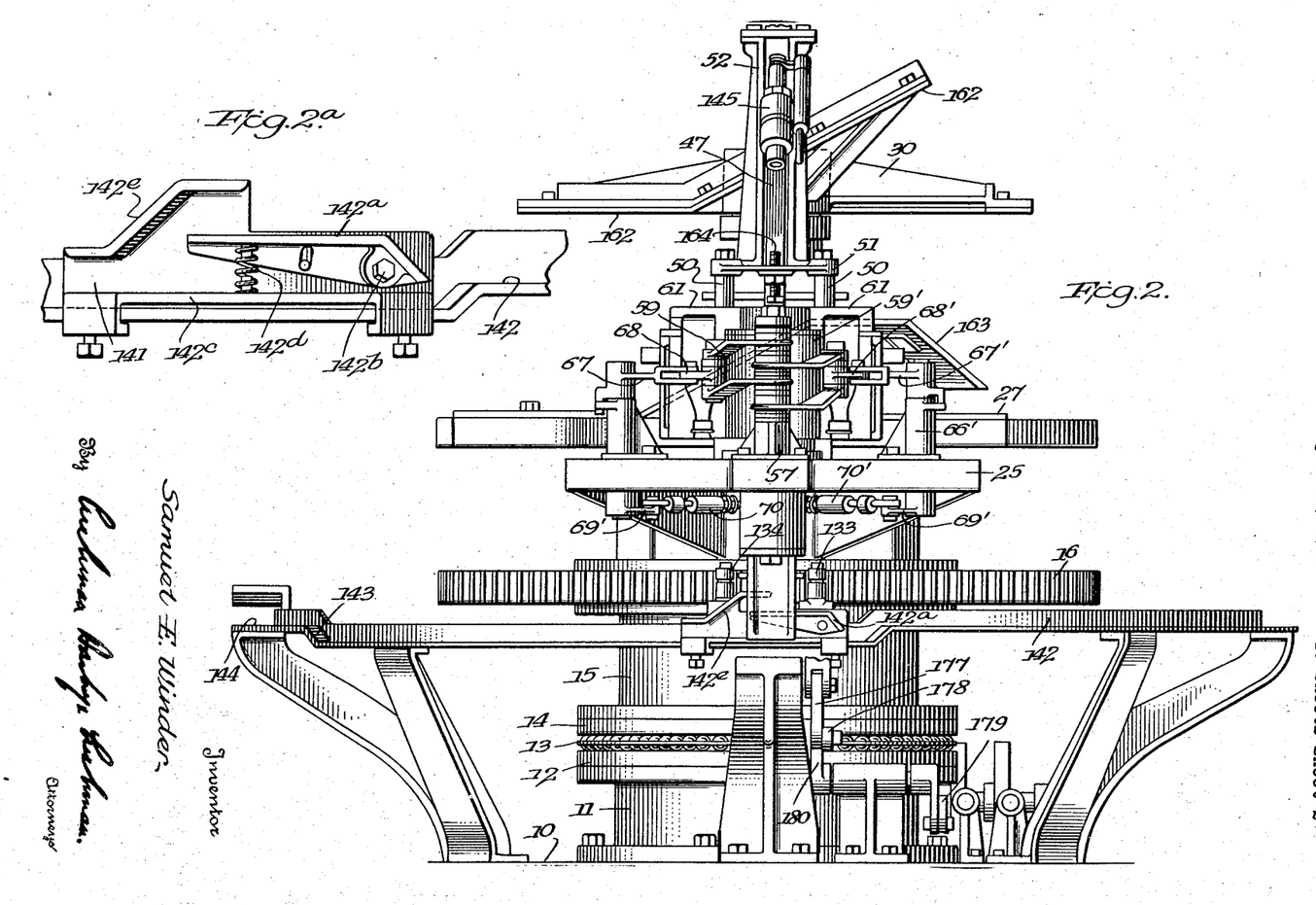
Figure 2 is an end elevation taken from the left of Figure 1.
Figure 2a is an elevational view of a detail of the machine, comprising cam means for operating the neck pin and the blowing-air valve.
Figure 13:
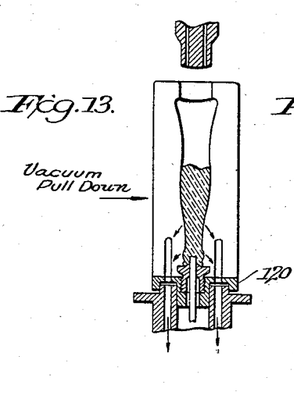
Figures 13 to 17 inclusive are diagrammatic views showing the several operations performed on a charge of glass during the manufacture of a finished bottle.

As shown in Figures 2, 2a and 3, the movement of the valve body 138 and the slide 140 is controlled by a roller 141 riding along a cam track represented generally by 142. A portion 142a of this track is pivoted at 142b in a bracket 142c, and pressed upwardly by a spring 142d. The pivoted track section serves to project the valve body and the pin 138 to the uppermost position, as shown in Figures 3 and 13. The spring 142 provides a resilient upwardly directed force to hold the parts in their upwardly projected position, and the force is sufficient to hold the parts in normal operative position, but the spring will prevent breakage of the parts if the pin is prevented from moving to its normal uppermost position. The bracket 142c includes a downwardly inclined, overhanging track portion 142e, adapted to pull the roller 141 downwardly into the lowermost, blowing position shown diagrammatically in Figure 14. The cam track 142 (Fig. 2) has an upwardly inclined portion 143, merging with a horizontal portion 144, and serving to raise the roller 141 from the lowermost, blowing position to an intermediate, neutral position, substantially as shown in Figure 5.

The bracket 142c is preferably longitudinally or circumferentially adjustably mounted on the track 142, to effect changes in the timing of the movements of the roller 141 and valve 138.

Figure 12:
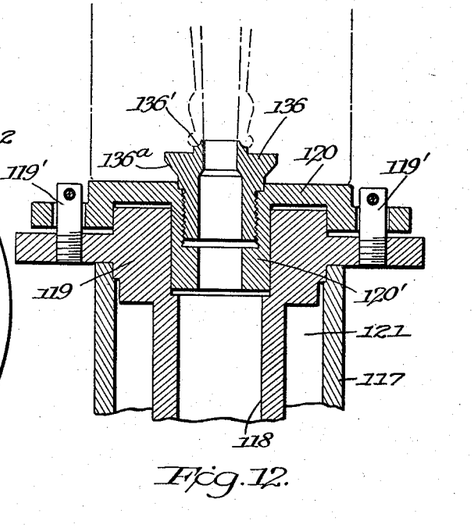
Figure 12 is a vertical section on line 12—12 of Figure 11.

As stated above, air for blowing the charge of glass into the form of a hollow parison and for blowing the parison into the form of a finished bottle, flows upwardly through the hollow interior of the inner casing 118, through the depending portion 120' of cap 120, and through the nipple 136. As shown in Figure 12, the cap 120 is preferably mounted for limited vertical movement with respect to the top flange 119 of the inner casing 118. A pair of pins 119' project upwardly from the top flange and extend through appropriate openings in the cap 120. The depending portion 120' of cap 120 is in tight sliding fit with the central bore in the top flange 119. The undersurface of the nipple 136 is inclined as at 136a, and is adapted to be engaged by a similar surface formed in the lower end of the parison and blow moulds. Therefore, when the moulds close about the nipple 136, the cooperating inclined surfaces mate with one another, to raise the nipple and the cap piece 120 slightly, so that the finish forming rib 136' of the nipple is brought into exact registry with the adjacent surfaces of the mould.

It will be noted that the parison moulds and the finish moulds shown in the accompanying drawings, both have open bottoms. The present invention includes a novel type of closure for the open bottoms of the moulds.

Figure 6:
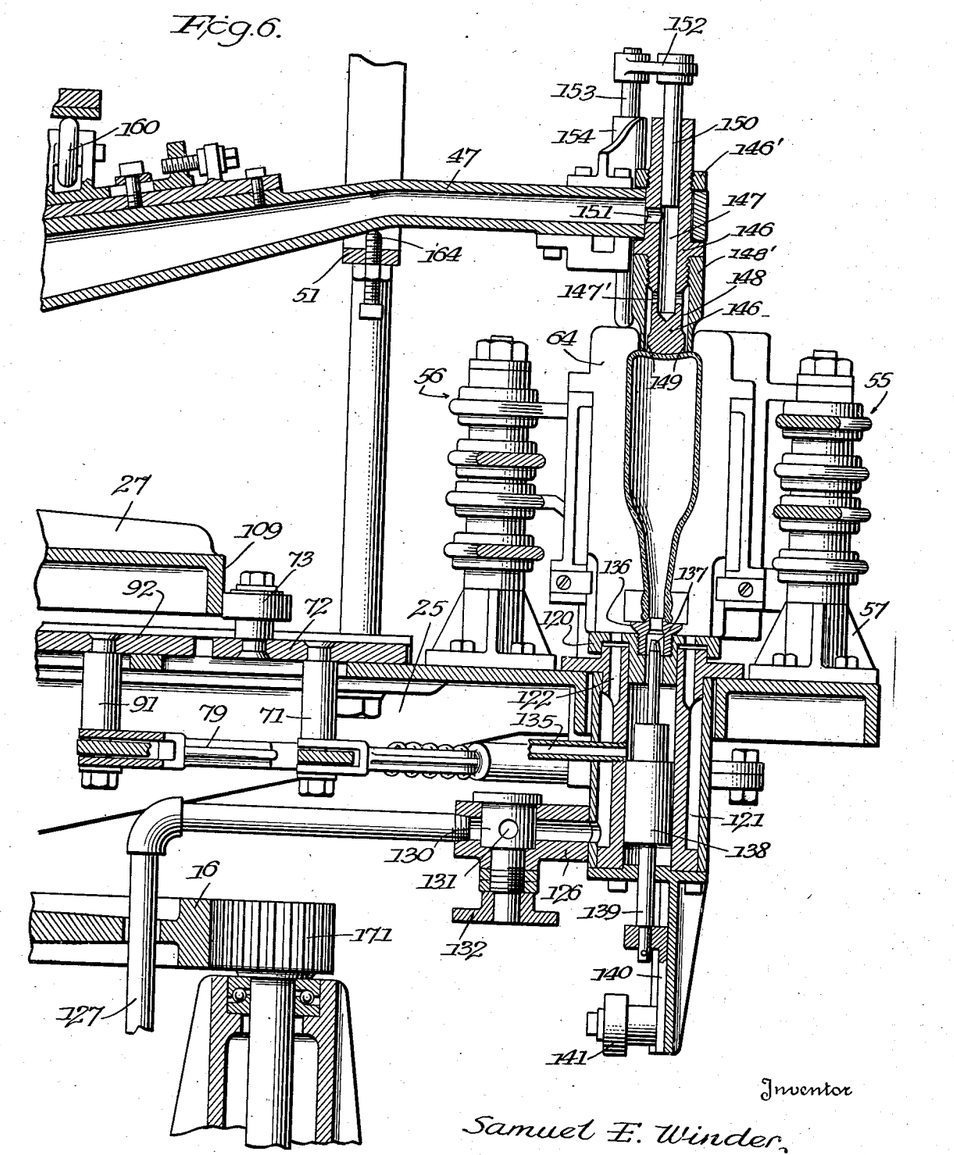
Figure 6 is a similar view showing the moulds at the finish blowing position.

As shown particularly in Figures 5 and 6, each hollow arm 47 carries, at its outer end, a downwardly projecting suction head 145, adapted to project into and close the open bottom ends of the inverted parison and blow moulds. Each suction head is provided with an inner core member 146 centrally and laterally bored at 147 and 147' and communicating with an annular space 148. The core member 146 is secured in a vertical opening at the end of arm 47 by a nut 146'. The suction head also includes an outer, lower sleeve 148', screwed to the core 146, and defining the outer surface of the annular space 148. A partial suction may be applied from the interior of the arm 47 to the bottom face 149 of the suction head. A valve body 150 is slidably mounted in the bore 147, to cover and uncover the lateral port 151 leading to the interior of the arm 47. The valve body 150 is connected by a crosshead 152 to a parallel pin 153, slidably mounted in a bracket 154. A latch plate 155 cooperates with a circumferential groove 156 and with the rounded end 157 of the pin 153 to hold the parts in either of one of two positions. Referring to Figure 10 (Sheet 5) the plate 155 is pivoted to a bracket 158 secured to the lower face of arm 47, adjacent the suction head 145. The plate is urged outwardly into contact with the pin 153 by a compression spring 159 seated in a socket formed in the bracket 158. The pin is adapted to be moved to its upper position, to open the valve 150 by contact with the upper end of the parison mould, upon descent of the arm 47 and the blow head 145, as hereinafter explained. The pin is moved to its opposite position to close the valve when the arm moves to its upper limit of movement, by contact with an adjustable abutment 158 (Fig. 1).

As heretofore pointed out, the arm 47 is pivoted on a horizontal axis in the bifurcated bracket 46. As shown in Figure 3, the bracket 46 has a vacuum passage 49 therein, terminating at its upper end in an inwardly facing opening 48. In Figure 4, the opening 48' which registers therewith, is shown. The openings are so proportioned that they are always in registry whether the arm 47 is in its upper or lowermost position. Thus, the hollow interior of each arm 47 is always in communication with the source of vacuum connected to the central pipe 34.

Each arm 47 carries an upwardly disposed roller 160, adjustable longitudinally of the arm, and a downwardly projecting roller 161. An upper cam track 162 is carried by the cam plate 30, and a lower cam track 163 (Fig. 3) is supported above the stationary cam plate 27. The upper cam plate serves to move the arm downwardly into firm engagement with a stop screw 164 mounted at the lower end of the slot in the guide bracket 52. The lower cam track 163 raises the arm 47 and the blow head, for purposes hereinafter described.

Any convenient means may be employed for imparting continuous rotation, preferably in a clockwise direction, to the machine. As shown in Figure 1, a suitable speed change device 170 is provided with a gear 171 in mesh with the main gear 16, whereby continuous rotation at any desired speed is imparted to the table. The power transmission device 170 is preferably of a type having a lateral shaft 172 projecting therefrom. This shaft may be conveniently used as a means for timing the oscillations of the gob feeding funnel 115.

The funnel 115 is preferably supported at the upper end of a stationary post 173 on a horizontally oscillating shaft 174. The shaft has a crank arm 175 at its rear end, connected to a link 176, which, in turn, is attached at its lower end to one arm of a bell crank lever 177, the other arm of which is connected through links 178 and 179 and lever 180 to a sliding plunger 181, adapted to be reciprocated by the shaft 172, by means of a cam or eccentric 182. Thus, every time a parison mould comes to a charging position under the funnel 115, the latter will be oscillated on a horizontal axis, so that the lower end of the funnel moves with the mould a short distance. This conjoint movement will be sufficient to guide the lower end of a rapidly falling gob of glass into the parison mould.

Figure 14:
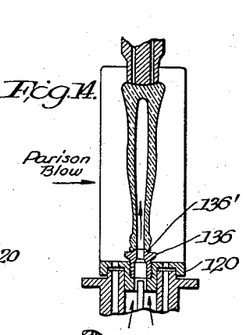

In Figure 9, the cycle of operation of the machine of the present invention is diagrammatically illustrated. Figures 13 to 17 show the several stages in the manufacture of a bottle. At position A, Figure 9, a gob is fed into a parison mould by the funnel 115, and immediately prior to the reception of the gob, the star wheel 132 has been turned by the roller 133 so as to apply a vacuum to the lower end of the mould. Consequently, as soon as the gob is received in the mould, the glass will be drawn downwardly into the neck finish portion, around the end of the neck forming pin 137, which, at that time, is in its upwardly projected position. The vacuum pull down step is shown in Figure 13. The star wheel is then turned by the roller 134 to terminate the suction pull down. Simultaneously with this action, the suction head 145 is lowered to close the upper open end of the parison mould. The lowering movement of the suction head pushes the pin 153 upwardly and opens the port 151 so that a vacuum is applied to the face of the suction head. At the same time, the neck pin 137 and the valve body 138 are pulled downwardly to their lowermost positions, thereby uncovering the pipe 135 and permitting the flow of blowing-air upwardly through the nipple 136 into the interior of the parison. The parison is therefore blown upwardly in the parison mould to hollow form, against the suction head 145, as shown in Figure 14. This blowing operation is represented at B in Figure 9.

After the parison has been blown to hollow form, the neck pin 137 and the valve body 138 are raised to the intermediate position shown in Figure 5, cutting off the blowing-air. The pin 137, however, is not projected upwardly through the nipple 136. The parison mould is simultaneously opened by the action of the roller 74 entering the cam end member 105, as represented at C in Figure 9.

Figure 15:
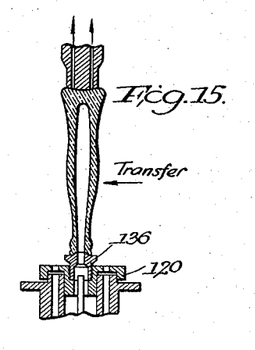

The blown parison is supported, during and after the opening of the parison mould, by the suction head 145, as shown in Figure 15. The lower end of the parison is held or steadied by the nipple 136 which has an upstanding annular rim 136′ engaging the inner periphery of the finish. Thus, the transfer is effected throughout the portions of the cycle represented by C and D in Figure 9. In the present machine, there is, in reality, no transfer of a parison from a blank mould to a blow mould because, actually, the parison is relatively stationary and the moulds, rather, are transferred.

Figure 16:
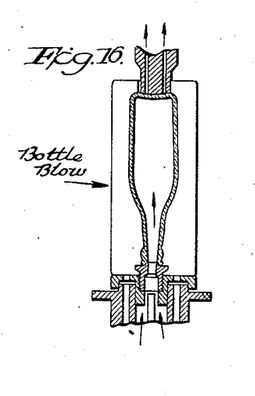

At the beginning of the portion of the cycle E, blowing-air is admitted to blow the parison to finish form. After the blow mould has been closed around the parison, the valve body 138 is again depressed to its lowermost position, thereby uncovering the port 135 and permitting the flow of blowing-air upwardly through the nipple 136 into the interior of the parison to expand the same to the form of the blow mould, as shown in Figure 16. The blowing-air preferably remains on throughout a substantial part of the cycle of the machine or until immediately before the blow mould starts to open.

Figure 17:
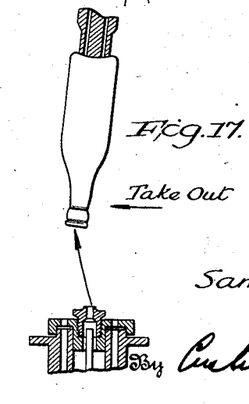

As shown at F, Figure 9, the blow mould is opened by the entrance of the roller 94 into the cam end piece 108. As soon as the mould is completely open, the cam 163 raises the arm 47 and the suction head 145 to their upper limit of movement. Since the suction is still being applied to the lower face of the suction head and to the blow or bottle in contact therewith, the bottle will be raised upwardly with the suction head, as shown in Figure 17. The bottle will be held firmly in contact with the suction head until the suction is cut off. That action is accomplished when the pin 153 or the crosshead 152 strikes the adjustable abutment 158 carried at the upper end of the slotted bracket 52. Preferably, a trough, chute, or other conveyor is positioned above the machine in position to receive the bottle when it is released by the suction head, to carry the same away to an annealing lehr or the like.

I claim:

1. A fully automatic glassware forming machine comprising a continuously rotating table, an inverted parison mould on the table for receiving a charge of molten glass, means for compacting the lower end of the charge in the neck finish portion of said mould, means for blowing the charge upwardly in said mould to form a hollow inverted parison, suction means engaging the upwardly disposed bottom end of the parison, means for opening and removing the parison mould from about the parison, leaving the bare hollow parison supported in fixed position relative to the table by said bottom engaging means, a blow mould on the table, automatic means for closing the same about the thus supported parison, automatic means for blowing the inverted parison to finished form in inverted position in said blow mould, and means actuated by the rotation of the table for controlling the operations of all of said means.

2. A fully automatic glassware forming machine comprising a continuously rotating table, a permanently inverted parison mould, automatic means for compacting a charge of glass in the lower, neck finish portion of the parison mould, automatic means for blowing the charge upwardly in said mould to form a hollow inverted parison, a suction head closing the upwardly disposed bottom end of the parison mould, automatic means for opening the parison mould, leaving the bare hollow parison supported by said suction head, a blow mould, automatic means for closing the blow mould about the suction head and the parison supported thereby, and automatic means for blowing the inverted parison to finished form in inverted position in said blow mould, said automatic means all being actuated and controlled by the rotation of said table.

3. A fully automatic glassware forming machine comprising a mould support rotatable about a vertical axis, means for continuously rotating the support, a parison mould on the support disposed permanently in neck-down position and having an open bottom, a mould bottom closing head movable to cooperative position with respect to the parison mould, a finish mould on the support at the same level as the parison mould and disposed permanently in neck-down position and also having an open bottom, automatic means for blowing a parison into hollow form in inverted position with its bottom against said head, automatic means for opening the parison mould, leaving the parison supported from said head, automatic means for closing the finish mould about the inverted parison while maintaining the head and the supported parison stationary relative to said support, and automatic means for blowing the parison to finished form in inverted position in said finish mould, said automatic means all being controlled and actuated by the rotation of said support.

4. In a glassware forming machine, a rotary mould table, a pair of permanently inverted parison and blow moulds thereon having open bottoms, said moulds being pivoted about spaced axes for alternate closing movement about a common moulding axis fixed with respect to said table, a movable suction head adapted to serve as a closure member for said open bottoms, means for blowing a parison to hollow form in said parison mould against said head, means for swinging the parison mould open leaving the blown parison supported in inverted position by said suction head, and means for swinging the blow mould to closed position around the parison while the latter is so supported, said mould swinging means being automatically controlled and actuated by the rotation of the mould table.

5. In a glassware forming machine, a rotary mould table, a pair of permanently inverted parison and blow moulds thereon having open bottoms, said moulds being pivoted on the table for closing movement about the same moulding axis, a movable suction head adapted to serve as a closure member for said open bottoms, means for blowing a parison to hollow form in said parison mould against said head, means for engaging the neck finish of the parison, means for opening the parison mould, leaving the blown parison supported in inverted position between said finish engaging means and said suction head, a blow mould on said table, means for closing the blow mould around the parison while the latter is so supported, and means for blowing the parison to finished form in said blow mould in inverted position, said mould opening and closing means being automatically controlled and actuated by the rotation of the mould table.

6. In a glassware forming machine, a rotary table, permanently inverted parison and blow moulds mounted thereon at the same elevation and having open bottoms, a movable suction head adapted alternately to close each open bottom, means controlled by rotation of said table for blowing a parison to hollow form in said mould against said head, means actuated by the rotation of said table for opening the parison mould, leaving the blown parison supported in inverted position by said suction head at the level of the parison and blow moulds, means actuated by the rotation of said table for closing the blow mould about the parison while the latter is so supported, and means controlled by the rotation of said table for blowing the parison to finished form in said blow mould in inverted position.

7. In a glassware forming machine, a rotary table, a permanently inverted parison mould pivoted thereon for opening and closing movements and having an open bottom, a movable suction head adapted to close said open bottom, means controlled by rotation of said table for blowing a parison to hollow form in said mould against said head, means actuated by the rotation of said table for swinging the parison mould open, leaving the blown parison supported in inverted position by said suction head, a blow mould pivotally mounted on said table at the same level as the parison mould, means actuated by the rotation of said table for swinging the blow mould closed about the parison while the latter is so supported, means controlled by the rotation of said table for blowing the parison to finished form in said blow mould in inverted position, means for opening said blow mould, and means actuated by the rotation of said table for raising said suction head and the blown article supported thereby to a take-out position above the level of said blown mould.

8. In a glassware forming machine, a continuously rotating mould table, a permanently inverted parison mould thereon having an open bottom, a movable suction head adapted to close said open bottom, automatic, cam controlled means for blowing a parison to hollow form in said mould against said head, neck finish engaging means mounted in fixed position on said table, automatic, cam actuated means for opening the parison mould, leaving the blown parison supported in inverted position between said neck finish engaging means and said suction head, a blow mould mounted on said table, automatic cam actuated means for closing said blow mould around the parison while so supported, and automatic cam actuated means for blowing the parison to finished form in inverted position in said blow mould, said cam controlled and cam actuated means all being operated in predetermined time sequence by the continuous rotation of said machine.

9. In a glassware forming machine, a continuously rotating mould table, a permanently inverted parison mould thereon having an open bottom, a movable suction head adapted to close said open bottom, stationary cam means adapted to control the movement of said head upon rotation of said table to close said open bottom after the reception of a charge of glass in said mould, automatic means including a stationary cam surface and a valve actuated thereby during the rotation of the table for blowing the charge into the form of a hollow parison in said mould against said head, neck finish engaging means mounted in fixed position on said table, automatic cam means for opening the parison mould, leaving the blown parison supported in inverted position between said neck finish engaging means and said suction head, a blow mould mounted on said table opposite the parison mould, cam following means actuated by the rotation of the table for closing said blow mould around the parison while so supported, automatic means including said valve and another stationary cam surface for blowing the parison to finished form in inverted position in said blow mould, said first-mentioned cam means being shaped to move said head away from said parison mould prior to the reception of the next charge of glass.

10. In a glassware forming machine, a continuously rotating mould table, a permanently inverted parison mould thereon having an open bottom, a movable suction head adapted to close said open bottom, stationary cam means adapted to control the movement of said head upon rotation of said table to close said open bottom after the reception of a charge of glass in said mould, cam controlled means for blowing the charge to the form of a hollow parison in said mould against said head, neck finish engaging means mounted in fixed position on said table, automatic cam means for opening the parison mould, leaving the blown parison supported in inverted position between said neck finish engaging means and said suction head, a blow mould mounted on said table at the same level as the parison mould, cam means actuated by the rotation of the table for closing said blow mould around the parison while so supported, and cam means controlled by the rotation of the table for blowing the parison to finished form in inverted position in said blow mould, cam means operative thereafter for opening the blow mould, leaving the blown article supported by said suction head, said first-mentioned cam means serving to raise said head and the bottle supported thereby above said blow mould upon further rotation of said table.

11. An automatic glassware forming machine comprising a continuously rotating table, a series of permanently inverted parison moulds pivotally mounted thereon about axes fixed with respect thereto, each having an open bottom, a corresponding series of permanently inverted, open bottom blow moulds pivotally mounted on said table about axes fixed with respect to the first-mentioned axes, a series of movable suction heads mounted for rotation with said table, each head being adapted to cooperate alternately with the open bottom of a parison mould and its corresponding blow mould, automatic means for successively blowing hollow inverted parisons upwardly in the parison moulds against said heads, means for successively opening the parison moulds and suspending the bare, hollow, inverted parisons from the corresponding suction heads, means for successively closing the blow moulds about the suspended parisons, and means for successively blowing the parisons to finished form in inverted position in the blow moulds.

12. An automatic glassware forming machine comprising a rotatable table, a plurality of pairs of permanently inverted parison and blow moulds pivotally supported in radial alignment about spaced axes on said table, the moulds of each pair having open bottoms and being adapted to close at the same level about a common axis, a suction head for each pair of moulds adapted to close said open bottoms, a neck finish forming member associated with each pair of moulds and fixed with respect to the table, means for blowing a parison to hollow form in each parison mould against its suction head, means for opening the parison moulds successively, leaving the parisons supported in inverted position between the suction heads and the neck finish forming members, means for closing the blow moulds about the thus supported parisons, and means for successively blowing the parisons to finished form in inverted position in the blow moulds.

13. An automatic glassware forming machine comprising a rotatable table, a plurality of pairs of permanently inverted parison and blow moulds, the moulds of each pair being pivotally mounted for opening and closing movement on vertically disposed, radially aligned, spaced posts secured to said table, said moulds having upwardly disposed, open bottoms, a suction head for each pair of moulds adapted to close said open bottoms, a neck finish forming member fixed to said table between each pair of posts and aligned vertically with the corresponding suction head, means for forming a hollow inverted parison successively in each parison mould between its neck finish forming member and its suction head, means for opening the parison moulds successively, leaving the inverted parisons supported between the members and the heads, means for closing the blow moulds about the parisons while so supported, and means for blowing the parisons to finished form in inverted position in the blow moulds.

14. An automatic glassware forming machine comprising a rotatable table, a plurality of pairs of permanently inverted parison and blow moulds, the moulds of each pair being adapted to close about a common axis and being pivotally mounted for opening and closing movement on vertically disposed, radially aligned, spaced posts secured to said table, said moulds having upwardly disposed, open bottoms, a suction head for each pair of moulds adapted to close said open bottoms, means for forming hollow inverted parisons successively in parison moulds below their suction heads, means for opening the parison moulds successively, leaving the inverted parisons supported from the suction heads, means for closing the blow moulds about the parisons while so supported, and means for blowing the parisons to finished form in inverted position in the blow moulds.

15. An automatic glassware forming machine comprising a rotatable table, a plurality of pairs of permanently inverted parison and blow moulds supported in radial alignment on said table, the moulds of each pair being adapted to close about a common axis and having open bottoms, a suction head for each pair of moulds disposed on said axis and adapted to close the open bottoms of the moulds, an annular neck finish forming member associated with each pair of moulds and fixed with respect to the table on said axis below the associated suction head, a mouth forming pin adapted to be projected through each annular member, means for moving each pin, an air conduit controlled by the movement of each pin for blowing-air through said annular member to blow a parison to hollow form in the associated parison mould against its suction head, means for opening the parison moulds successively, leaving the successive parisons supported in inverted position between their suction heads and annular neck finish forming members, means for successively closing the associated blow moulds about the thus supported parisons, and means for again moving the mouth forming pins to blow air through the annular members to blow the parisons to finished form in inverted position in the blow moulds.

16. In a glassware forming machine comprising a rotatable table having a plurality of pairs of permanently inverted parison moulds and permanently inverted blow moulds pivotally mounted thereon about spaced axes fixed with respect thereto, means for effecting a transfer of an inverted, hollow, blown parison from the parison mould of a pair to the corresponding blow mould, said means comprising a suction head forming the bottom of the parison mould, a relatively stationary neck finish engaging member, means for swinging each parison mould open, leaving the blown parison suspended between said head and said member in fixed relation to the table, and means for swinging the blow mould to closed position about the suspended parison and the suction head while the latter is so supported in fixed position, said mould swinging means being automatically controlled and actuated by the rotation of the mould table.

17. In an automatic glassware forming machine comprising a rotatable table, a plurality of pairs of permanently inverted parison and blow moulds on the table, each having an open bottom, a suction head mounted for lowering movement to close the open bottom end of the parison mould of each pair, means for lowering each head after the deposit of a charge of glass in the corresponding parison mould, means for forming a parison in each parison mould, valve means actuated by said lowering movement of said head to apply suction through said head to the bottom end of a parison in said mould, means for opening the parison mould, means for maintaining each suction head in fixed relation to said table as the parison mould associated therewith opens to suspend the blown parison from the suction head, means for closing the blow mould of said pair around the suction head and the suspended parison, means for blowing the parison to finished form in the blow mould, means for opening the blow mould, leaving the blown article suspended from said suction head, and means for raising the suction head and the blown article suspended thereby to a position above said blow mould, said valve means being actuated by said raising movement of the head to cut off said suction, thereby releasing the blown article from the head at a discharge point.

18. In a continuously rotating bottle blowing machine including a rotatable table, permanently inverted parison moulds and permanently inverted blow moulds mounted on and rotatable with the table, means for effecting a transfer of a hollow, blown, inverted parison from a parison mould to the corresponding blow mould during rotating of the table, said means comprising a suction head mounted on the table for rotation therewith and engageable with the upper bottom end of the parison, a neck finish engaging member fixed with respect to the table, means controlled by the rotation of the table for holding the suction head in fixed relation to said member during said transfer, means for opening the parison mould while said head is so held leaving the parison suspended between said head and said member, and means for closing the blow mould around the parison while so suspended, said neck finish engaging member serving to prevent swinging of the lower end of the parison due to rotation of the table.

19. A glassware forming machine comprising a rotatable table, an inverted, open-bottom parison mould, an inverted, open-bottom blow mould, said moulds being mounted for movement to closed position about a common moulding axis, a suction head mounted for movement between a position closing the open bottoms of the moulds and a ware take-out position, means controlled by the rotation of the table for opening and closing the moulds and for moving said suction head to said positions, a suction line leading to said head, and means for controlling the application of suction to said head, said means comprising a valve in the suction line, a valve operating member movable with said head, means positioned to be engaged by the operating member to open the valve when the head is moved into mould closing position, and abutment means positioned to be engaged by the operating member adjacent the take-out position to close the valve and cut off the suction when the head is moved to that position.

20. A glassware forming machine comprising a rotatable table, an inverted, open-bottom parison mould, an inverted, open-bottom blow mould, said moulds being mounted for movement to closed position about a common moulding axis, a suction head mounted for movement between a position closing the open bottoms of the moulds and a ware take-out position, means controlled by the rotation of the table for opening and closing the moulds and for moving said suction head to said positions, a suction line leading to said head, and means for controlling the application of suction to said head, said means comprising a valve in the suction line movable with said head, a valve shifting pin carried by said head, means in the path of movement of said pin to open the valve when the head is moved into mould closing position, and abutment means in the path of movement of said pin for closing the valve adjacent the take-out position.

SAMUEL E. WINDER.